July 12, 1938.   B. CLAYTON ET AL   2,123,767
PROCESS OF FORMING PLANT PARASITICIDAL VAPORS
Filed April 6, 1935
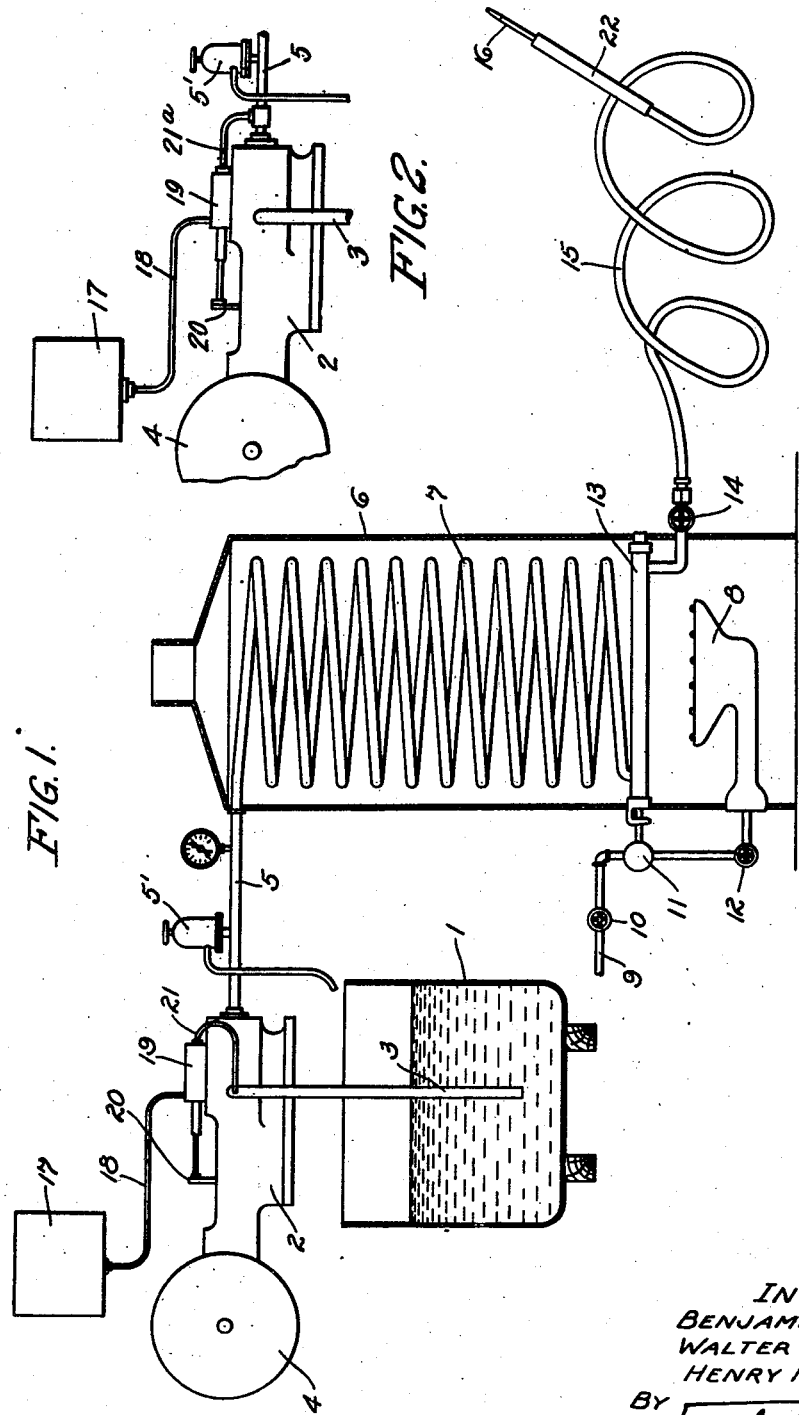
INVENTORS
BENJAMIN CLAYTON
WALTER B. KERRICK
HENRY M. STADT
BY
ATTORNEY.

Patented July 12, 1938

2,123,767

UNITED STATES PATENT OFFICE 2,123,767

PROCESS OF FORMING PLANT PARASITI-
CIDAL VAPORS

Benjamin Clayton, Sugarland, Tex., Walter B. Kerrick, Los Angeles, and Henry M. Stadt, Glendale, Calif., assignors to Refining, Inc., Reno, Nev., a corporation of Nevada Application April 6, 1935, Serial No. 15,052
In the Netherlands November 7, 1931

3 Claims. (Cl. 21—58)

This invention relates to improvements in process of forming plant parasiticidal vapors, and more particularly to a process for diffusing film forming germicides in water.

The principal object of the invention is to apply germicidal and fungi destroying films on insects, plants and vegetation without injury to the plant life.

Another object is to highly nebulize the oil or other colloid and apply it to the plant in the form of a light vapor that will form a cloud and condense on the whole surface of the plant or tree.

Another object is to convey the oil film to the surface to be treated without modifying or minimizing the essential effectiveness of the oil for killing insects, scale, fungi and the like, and their eggs, larvae, spores and other forms of propagation.

Other objects and advantages will appear as the description progresses.

The germicidal effect of oil, especially certain low viscosity mineral oils, is well established. It is also a fact that such oil in excess is deleterious to plant life. It therefore becomes a matter of great delicacy to maintain the critical point in the application of oil to accomplish the maximal germicidal effect with the minimal effect on the plant life.

It has been the general practice heretofore to spray the oil directly onto the plants, which method is dangerous because any excess of oil "burns" the plant. To overcome this danger emulsification has been resorted to, which lowers the germicidal effectiveness of the oil, although it minimizes the danger to the plant, except that the chemical reagents that effect emulsification are also deleterious to plant life.

The present invention combines a method and apparatus capable of so finely dividing the molecules of oil and water and intermingling them in such uniform diffusion that when liberated in the form of a moist vapor, the vapor will condense on the plant surfaces with such a highly nebulized mixture of oil and water that the plant is protected against unatomized splashes of oil settling thereon.

This condensation separates the oil and water. The oil penetrates the "scale" or other form of parasite life to which it is fatal. The water evaporates, which lowers the temperature and otherwise effectively minimizes the reaction or "burning" effect of the union of the oil and plant chemistry.

Parasitical forms of life are inured to water and moisture because that is the natural environment of plant life, but they are very susceptible to oil penetration, for which they have neither mechanical protection nor counter-acting antibodies.

In this specification and the accompanying drawing the invention is disclosed in its present preferred form. It is to be understood, however, that it is not limited to this form because it may be embodied in other forms within the purview of the claims following the description.

The accompanying single sheet of drawings illustrates means for producing sprays in accordance with the principles of the invention. In said drawing:

Figure 1 diagrammatically shows a spray producing apparatus, certain parts thereof being shown in vertical cross-section; and Figure 2 is a view illustrating a modification of the apparatus shown in Figure 1.

For further particulars regarding this apparatus attention is directed to the copending application in the name of Walter B. Kerrick, entitled Fluid heater, filed November 6, 1930, Serial Number 495,636.

In detail the construction illustrated in the drawing comprises the water tank 1 and the pump 2 having its intake 3 extending into the tank 1. The pump is driven by a suitable gearing 4 actuated by a prime mover such as an internal combustion engine for portable outfits, not shown. The outlet 5 from the pump leads through the valve 5' into the top of the heater.

The outer shell 6 of the heater encloses a continuous coil 7 of any desired construction so long as the liquid flows downward toward the source of heat without traps, dead spaces, and the like, for reasons which will hereinafter appear.

The heating means in the present instance consists of the gas burner 8 located beneath the coil 7. The gas supply pipe 9 has the valve 10, the thermostatic valve 11, and manual valve 12 therein. The thermostatic element 13 is interposed between the coil 7 and the burner 8 and through a suitable mechanism 14 controls the fuel valve 11 to synchronize the volume of heat from the burner 8, with the desired temperature in the coil. This desired temperature can be predetermined by a proper adjustment of the mechanism 14, in the usual manner of thermostatic controls. In this connection see the patent in the name of Walter B. Kerrick, entitled Thermostatic control, dated July 31, 1934, Number 1,968,525.

The coil 7 discharges through the outer shell of the thermostat 13, which receives the direct heat of the burner 8, so that the temperature of the fluid heats the expansive element (not shown) confined within the tube 13 which is completely surrounded by the liquid and thus is insulated from the direct action of the burner heat. From the thermostat the liquid flows through the valve 14, the flexible hose 15, and is atomized through the nozzle 16 which has a calibrated orifice proportioned to the capacity of the pump 2, so that a fixed back pressure is maintained on the liquid within the coil 7. This back pressure may be varied by manipulating the valves 5'—14.

The mineral oil of low viscosity is contained in the receptacle 17 and fed through the tube 18 to the metering pump 19. The plunger of this pump is connected by the bracket 20 with the piston rod of the pump 2. This bracket connection at 20 is such that a desired lost motion may be introduced to regulate the length of the stroke of the metering pump 19. In this manner the capacity of the metering pump may be predetermined. The metering pump discharges through the outlet 21 into the intake pipe 3 of the pump 2. The inlet 3 is preferred because the suction of the pump 2 will pull the quantity of metered oil out of the tube 21, and thus avoid any back pressure that would result if the oil were fed into the discharge 5. There is the further advantage that the oil is subjected to the mixing action of the pump which draws its charge of water from the tank 1, through the intake 3, but it is just as effective to introduce the oil into the discharge pipe 5 by a tube 21ª as shown in Figure 2.

Particular attention is directed to the specific combination of elements in the apparatus and the mode of operation, lest it be confused with ordinary water heaters and steam generators, the operation of which will not accomplish the desired nebulizing result.

The pump 2 delivers a predetermined volume of liquid at fixed intervals, against a calibrated orifice at the nozzle 16.

The heater has a fixed heating area which is subjected to a degree of heat from the burner 8 controlled by the thermostat 13. The functioning of these various elements establishes an automatic equilibrium in the heater. The by-pass valve at 5' permits bleeding a portion of the pump discharge back into the tank 1, to vary the feed of the heater. This valve may be of the pressure governor type, to act as a safety valve to protect the heater coil 7 against excess pressure.

The proper operation of this apparatus depends largely upon maintaining a constant volume or solid body of liquid from the pump 2 to the orifice 16. This liquid column is subjected to a gradually increasing temperature reaching its maximum in the tube 13 as the liquid flows toward the source of heat. As the temperature rises there is a proportional rise in pressure and increased velocity with incidental turbulence within the column of liquid. No voids such as would be caused by foaming, or excessive liberation of steam or vapor can be tolerated within this column, which would defeat the uniform diffusion and mixture of the oil and water particles. Such voids would tend to aid the formation of scale in the coil, cause surging, and irregular discharge at 16, and disrupt the homogeneity and continuity of the mixture. A good working condition is about 100 pounds pressure per square inch gage, with temperature between 350° to 375° Fahrenheit. While these temperatures are above the boiling point of water at 100 pounds per sq. in. gage (which is approximately 338° F.), they correspond to approximately the boiling range of certain mixtures of water and oil that have been found suitable for spraying. Moreover, said range is such that a portion of the water in the heating coil may be vaporized, but the quantity vaporized is so small that no substantial pockets of steam are formed in the heating coil. Thus, there is eliminated the formation of voids, surging, irregular discharge, and lack of homogeneity and continuity of the mixture above referred to. Furthermore, it is pointed out that the velocity of the mixture in the coil is such as to maintain any steam bubbles which may have been formed in said coil in substantially dispersed or segregated condition and in this way prevent the formation of objectionable and undesirable voids or steam pockets.

The pump 2 is preferably of small displacement and kept up to capacity by speed, to avoid undue pulsations in the fluid column. The pumping unit is equipped with check valves in the intake and discharge pipes in the usual manner. An air chamber may be introduced into the pipe 5, if a pump of larger displacement and slower speed is used.

It is important that the introduction of the oil into the measured quantities of water by the metering pump be accurately coordinated as to time and quantities to maintain uniformity in the product. The system of introducing the oil into the water is adhered to in preference to attempting to form a mixture or an emulsion in the tank 1.

A solution of agar and a germicide may be substituted for the oil in the receptacle 17. In fact, there are many germicidal mixtures that may be so introduced into the water, that are very effective after having been heated in the coil 7 and nebulized at the nozzle 16. The applied films are so intangible after the water evaporates that they are soon dissipated and leave the plant surface, except that absorbed by the parasitical germ life.

This invention is directed to the destruction of the pest in its prenatal stage. This may be accomplished by a smothering film of sufficient duration to suffocate the germ, or by germicides, or both. The object is to accomplish the extermination of the pest in any stage of development by means that will disintegrate and relieve the plant of any deleterious deposit tending to choke the pores of the plant.

Even soluble, dry powders introduced into the tank 1 or into the line 5 by suitable metering means similar to the pump 19 will become so highly comminuted and diffused within the coil that it will be more uniformly distributed on the plant than by any other method known to applicants.

When the mixture, of whatever nature, passes through the heater, it is nebulized at the nozzle 16, by the sudden expansion into the atmosphere with an attendant drop in temperature resulting in a warm vapor. The hand can be held in the vapor within a foot of the nozzle 16, while the hose 15 adjacent the nozzle is too hot to handle without the wooden insulator 22.

The vapor is directed at the plant or tree close enough to insure the deposit of the oil-water film. This application, however, should not be confused with spraying liquids with high pressure jets as in the conventional orchard practice, in which a tree is literally encrusted with oil or wash. In the present instance oil deposits will be found which are caused by the drifting vapor at considerable distances from the point of application.

It is desired to make a distinction between the present nebulized mechanical mixture and emulsions containing a reagent as a third element in the mixture.

The oil passed by itself only through the heater will form a nebulized oil vapor. Such a vapor alone is fatal to parasites but dangerous to the plant life because of the excess of oil. Water alone passed through the heater will form moisture in a nebulous cloud or fog, without germicidal qualities. A proper mixture of these vapors as comprehended in this invention is ideal for the purpose intended.

While the invention above described is especially adapted to produce an intimate mixture of water and a substance which is lethal to insect life, such, for example, as an oil or germicide, it also has other uses in the arts. The above specification clearly discloses a process of mixing two fluids which can be conveniently termed a primary fluid and a secondary fluid. The primary fluid in the embodiment of the invention above discussed is, of course water, and the secondary fluid is oil or a germicide, but the terms "primary fluid" and "secondary fluid" as used in the subjoined claims should not be so limited since the process can be used to produce an intimate heated mixture of other fluids. The two fluids in passing through the elongated tortuous passage of the heater provided by the pipe coil 7 are very intimately and uniformly mixed due to turbulence therein.

The process has a high degree of utility when either of the fluids is of such a nature that it is readily vaporized by heat, since it is possible to control the vaporization by maintaining a substantial pressure in the coil, such pressure being maintained largely by the impedance to the flow of fluids offered by the calibrated orifice of the nozzle 16. The term "friction head" is used to designate the pressure drop in the nozzle 16 due to the friction of the liquid passing therethrough.

This application is a continuation in part of our copending application Serial 553,358, filed July 27, 1931, entitled "Process of forming plant parasiticidal vapors".

We claim as our invention:

1. The method of producing a nebulous parasiticidal spray, which comprises, producing a mixture of water and oil by adding a predetermined metered volume of said oil to a proportionate quantity of said water at substantially regular intervals, forcing said mixture of water and oil through an elongated heating zone under superatmospheric pressure in the form of a flowing stream of restricted cross sectional area with sufficient velocity to cause turbulence of said stream in said zone, said pressure being sufficiently high to overcome the frictional resistance to flow of said stream and produce said velocity, heating said stream during turbulent flow through said heating zone to a desired temperature of such a degree that a substantial portion of said stream will be converted into vapor upon discharge into the atmosphere, and discharging said stream into the atmosphere so as to produce said nebulous spray.

2. The method of forming a nebulous parasiticidal spray which comprises, producing a mixture of water as a primary fluid and oil as a secondary fluid by adding a metered quantity of one to a metered stream of the other, pumping said mixture through an elongated heating zone under superatmospheric pressure in the form of a stream at a substantially uniform predetermined rate, heating said stream during flow to a desired temperature of such a degree that when the stream is discharged into the atmosphere a substantial portion of said water will be converted into vapor, varying said heating in accordance with variations in the temperature of said stream from said desired temperature to thus continuously attain said desired temperature, and discharging said heated stream into the atmosphere at a rate so correlated to said substantially uniform predetermined rate of pumping and to said desired temperature as to produce said nebulous spray.

3. The method of producing a parasiticidal spray, which comprises, producing a mixture of water and a material immiscible therewith having parasiticidal properties by adding a metered quantity of said material to a proportionate quantity of said water, pumping said mixture through an elongated heating zone under superatmospheric pressure in the form of a stream at a substantially uniform predetermined rate, said pressure being sufficiently high to overcome any frictional resistance to the flow of said stream and to impart thereto a velocity sufficient to maintain a substantially uniform dispersion of said material in said water during flow through said elongated heating zone, heating said stream during flow to a desired temperature of such a degree that when said stream is discharged into an atmosphere at a pressure lower than said superatmospheric pressure a substantial portion of said water will be converted into vapor, varying said heating in accordance with variations in the temperature of said stream from said desired temperature to thus continuously attain said desired temperature, and discharging said heated stream into said atmosphere at a rate so correlated to said substantially uniform predetermined rate of pumping and to said desired temperature as to produce said parasiticidal spray.

BENJAMIN CLAYTON.
WALTER B. KERRICK.
HENRY M. STADT.